United States Patent
Croxford et al.

(10) Patent No.: US 11,853,873 B2
(45) Date of Patent: Dec. 26, 2023

(54) NEURAL NETWORK OPTIMIZATION

(71) Applicants: Apical Limited, Cambridge (GB); Arm Limited, Cambridge (GB)

(72) Inventors: Daren Croxford, Swaffham Prior (GB); Jayavarapu Srinivasa Rao, Cambridge (GB)

(73) Assignee: Arm Limited, Cambridge (GB)

( * ) Notice: Subject to any disclaimer, the term of this patent is extended or adjusted under 35 U.S.C. 154(b) by 989 days.

(21) Appl. No.: 16/152,348

(22) Filed: Oct. 4, 2018

(65) Prior Publication Data
US 2020/0110995 A1    Apr. 9, 2020

(51) Int. Cl.
*G06N 3/08*      (2023.01)
*G06N 3/04*      (2023.01)

(52) U.S. Cl.
CPC ............... *G06N 3/08* (2013.01); *G06N 3/04* (2013.01)

(58) Field of Classification Search
CPC ........... G06N 3/08; G06N 3/04; G06N 3/0481
See application file for complete search history.

(56) References Cited

U.S. PATENT DOCUMENTS

2016/0358068 A1* 12/2016 Brothers ................ G06N 3/082
2018/0137417 A1*  5/2018 Theodorakopoulos ......................
                                             G06N 3/0454
2019/0122113 A1*  4/2019 Chen ....................... G06N 3/084

OTHER PUBLICATIONS

Ling et al., "TaiJiNet: Towards Partial Binarized Convolutional Neural Network for Embedded Systems," 2018 IEEE Computer Society Annual Symposium on VLSI (ISVLSI), 2018, pp. 136-141, doi: 10.1109/ISVLSI.2018.00034. (Year: 2018).*
Lai, et al., "CMSIS-NN: Efficient Neural Network Kernels for Arm Cortex-M CPUs," 2018 Cornell University, Neural and Evolutionary Computing, pp. 1-10. (Year: 2018).*
Gao et al., "ChannelNets: Compact and Efficient Convolutional Neural Networks via Channel-Wise Convolutions", Sep. 5, 2018, arXiv, https://arxiv.org/abs/1809.01330 (Year: 2018).*
A. Polyak and L. Wolf, "Channel-level acceleration of deep face representations," in IEEE Access, vol. 3, pp. 2163-2175, 2015, doi: 10.1109/ACCESS.2015.2494536. (Year: 2015).*

\* cited by examiner

*Primary Examiner* — James D. Rutten
(74) *Attorney, Agent, or Firm* — EIP US LLP (57) ABSTRACT

A method of reducing kernel computations; the method comprising ordering a plurality of kernel channels. A first of the ordered kernel channels is then convolved with input data to produce a convolution output, and it is determined whether to convolve one or more subsequent kernel channels of the ordered kernel channels. Determining whether to convolve subsequent kernel channels comprises considering a potential contribution of at least one of the one or more subsequent kernel channels in combination with the convolution output.

25 Claims, 6 Drawing Sheets

NEURAL NETWORK OPTIMIZATION

BACKGROUND TO THE INVENTION

Technical Field

The present invention relates to a method and system for optimizing neural network processing. More particularly, optimizing the processing by reducing the number of kernels to be processed for a particular layer of the neural network.

Background

Convolutional neural network use filter kernels to generate feature maps, often for the identification or classification of images and/or objects within input data. To identify or classify said images/objects a large number of calculations are undertaken. For example, depending on the feature to be identified/classified, a layer within the neural network may use a number of kernels, for example 64, 256 or 512. As a result, each layer within the network may require a large number of multiply accumulate calculations to be performed.

SUMMARY

According to a first aspect of the present disclosure, there is provided a method of reducing kernel computations; the method comprising ordering a plurality of kernel channels; convolving a first of the ordered kernel channels with input data to produce a convolution output; and determining whether to convolve one or more subsequent kernel channels of the ordered kernel channels, wherein the step of determining whether to convolve subsequent kernel channels comprises considering a potential contribution of at least one of the one or more subsequent kernels in combination with the convolution output.

According to a second aspect of the present disclosure, there is provided a system for reducing kernel computation, the system comprising an ordering module for ordering a plurality of kernel channels; a processing module for convolving the ordered kernel channels with input data to produce a convolution output; a determination module, wherein the determination module considers a potential contribution of at least one or more subsequent kernels in combination with the convolution output.

A non-transitory computer-readable storage medium comprising a set of computer-readable instructions stored thereon which, when executed by at least one processor, cause the at least one processor to produce a frame, the instructions comprising: ordering a plurality of kernel channels; convolving a first of the ordered kernel channels with input data to produce a convolution output; and determining whether to convolve one or more subsequent kernel channels of the ordered kernels, wherein the step of determining whether to convolve subsequent kernel channels comprises considering a potential contribution of at least one or more subsequent kernel channels in combination with the convolution output.

BRIEF DESCRIPTION OF THE DRAWINGS

Further features and advantages of the invention will become apparent from the following description, given by way of example only, which is made with reference to the accompanying drawings in which like reference numerals are used to denote like features.

DETAILED DESCRIPTION OF CERTAIN EMBODIMENTS

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one examples but not necessarily in other examples. It should be further noted that certain examples are described schematically with certain feature omitted and/or necessarily simplified for the ease of explanation and understanding of the concepts underlying the examples.

Convolutional neural networks typically comprise an input layer, a plurality of convolutional layers, a number of fully connected layers and an output layer. The input layer corresponds with an input to the neural network, such as input data. The convolutional layers are arranged to extract particular features from the input data to create feature maps and may only operate on a small portion of the input data. The fully connected layers then use the feature maps for classification.

Figure 1:
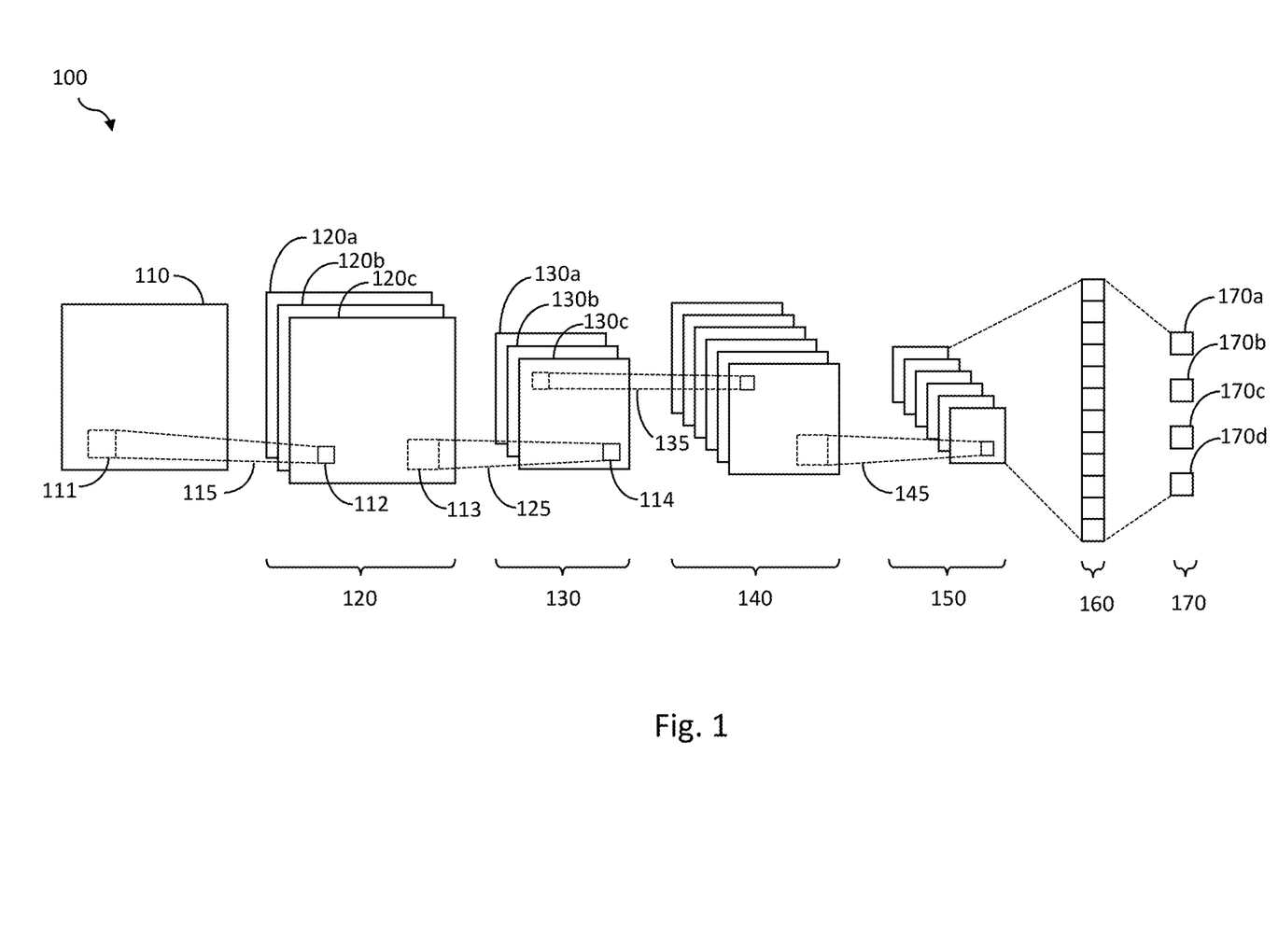
FIG. 1 is a schematic representation of a convolutional neural network.

FIG. 1 is a schematic representation of a convolutional neural network (CNN) 100. The CNN 100 includes a number of different layers 110, 120, 130, 140, 150, 160, 170. The CNN 100 may include an input layer 110, a plurality of convolutional layers 120, 140, a plurality of pooling layers, 130, 150, a number of fully connected layers 160, and an output layer 170. In this example, the input layer 110 corresponds to an input to the CNN 100 such as input data.

The input data 110 may, for example, be 224 pixels wide and 224 pixels high, and include 3 color channels (such as a red, a green and a blue color channel), The input data may undergo convolutions by the convolution layer 120 (as described below in relation to FIG. 3). The convolutional layer 120 typically extracts features from the input data to create feature maps or activation maps 120a, 120b, 120c. A region 111 of the input data is shown schematically undergoing convolution 115 to create an output 112. Convolutional layers 120, 140 may contain filters or kernels that are used to extract particular features from the input data. Each kernel of the convolutional layer 120 will produce a corresponding activation map 120a, 120b, 120c. The activation maps 120a, 120b, 120c of the convolutional layer 120 may then undergo pooling 125 before they are input into a second convolutional layer 140. Pooling 125, for example, allows values for a region of the input data or of an activation map 120a, 120b, 120c to be aggregated or combined. A region 113 of the activation map 120c is pooled 125 to create a pooled output 114.

In some examples, a max pooling procedure may be used. The highest value in a predefined region, such as a 2×2 pixel region, 113 of each activation map e.g. 120c may be determined. The highest value can then be used as an input to the second convolutional layer 140. As such, the 2×2 pixel region 113 is reduced to a single pixel 114.

Other such pooling procedures may be used, such as an average pooling or L2-norm pooling. Regardless of the pooling procedure used, pooling 125 may reduce the amount of computation for subsequent layers of the CNN 100. This is shown schematically in FIG. 1 as a reduction in the size of the activation maps 120a, 120b, 120c of convolutional layer 120 compared to the pooled activation maps 130a, 130b, 130c of the pooling layer 130.

After the input data has been processed by the convolutional layer 120 and the pooling layer 130, the CNN 100 may process the input data by using further convolutions, such as 135, by further convolutional layers, such as 140, and pooled 145 by further pooling layers, such as 150.

Whilst only two convolutional layers 120, 140 and pooling layers 130, 150 are shown in FIG. 1 for simplification, it will be appreciated that a CNN 100 may have a greater number of layers and be significantly more complex.

After the convolutional 120, 140 and pooling layers 130, 150, a fully connected layer 160 uses the activation maps of the last layer (in this example pooling layer 150) for classification. The activation maps from the convolutional 120, 140 and pooling layers 130, 150 represent high level features of the input data. The fully connected layer 160 uses the features to classify the input data into various outputs 170a, 170b, 170c, 170d. The fully connected layer 160 may use an activation function.

In general, neural networks, such as the CNN 100 of FIG. 1, described above, may undergo a training phase in which the neural network is trained for a particular purpose. In an illustrative example, the CNN 100 of FIG. 1 may be used to identify animals from photos. Given an input image of a photo of an animal, the CNN 100 can be used to classify the animal into one of four categories e.g. elephant 170a, tiger 170b, swan 170c or horse 170d. After processing the photo 110 with the CNN, the output probability for each category may be as follows: elephant 0.01, tiger 0.94, swan 0.04, horse 0.01. As such, the photo of the animal is categorized as a photo of a tiger.

A neural network, such as the CNN 100 of FIG. 1, may comprise a number of interconnected nodes, which may be referred to as artificial neurons, or neurons. The internal state of a neuron within the neural network (sometimes referred to as the activation) typically depends on an input received by the neuron, the weights, bias and type of activation function. The output of said neuron then depends on the input, kernel bias, and the activation. The output of some neurons is connected to the input of other neurons, forming a directed weighted graph in which edges (corresponding to neurons) or vertices (corresponding to connections) of the graph are associated with weights, respectively. The weights and bias may be adjusted throughout the training phase altering the output of individual neurons and hence of the neural network as a whole.

When training neural networks one or more kernels are generated. The kernels are associated with at least some of the layers of the network. The kernels, for example, allow features of an image or other data to be identified. Some kernels may be used to identify edges in the input and others may be used to identify horizontal or vertical features in the input data (although this is not limiting, and other kernels are possible). The precise features that the kernels identify will depend on the object that the neural network is trained to identify. In some embodiments, kernels may be three dimensional volumes having a width, height and depth, for examples 3×3×64.

Each of the kernels comprise a plurality of weights. During the training of the neural network, the weights of each kernel are determined. Each of the weights are adjusted so as to enable the kernel in the neural network to identify a particular feature of an input. Similarly, during the training phase, a bias may be generated. The bias may be added to the results of the kernel prior to being sent to the activation function.

Figure 2:
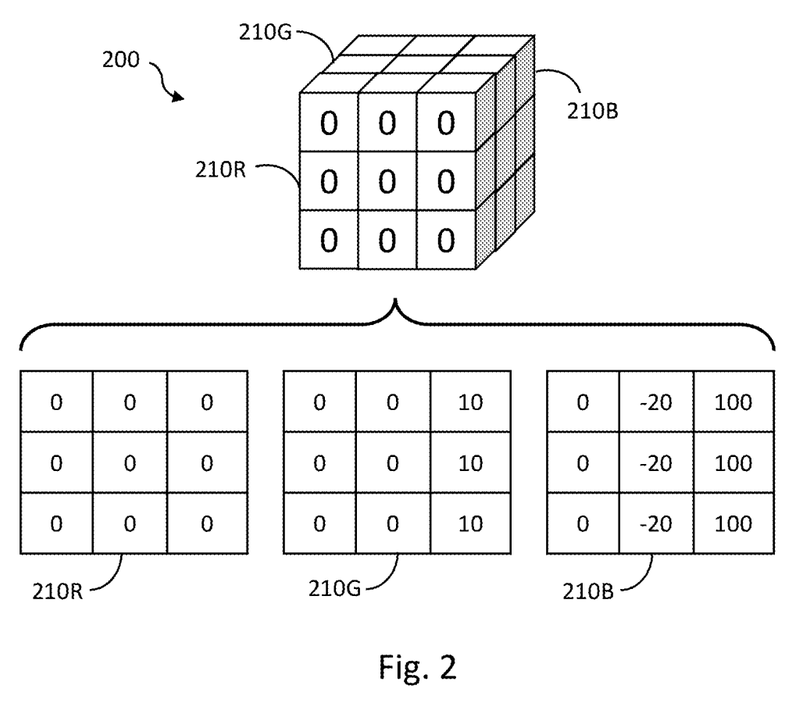
FIG. 2 is an example kernel generated by a training process for use with a convolutional neural network.

FIG. 2 shows an example kernel 200 generated by a training process. The kernel 200 is a 3×3×3 kernel which may be used, for example, for detecting a blue vertical line in an input image. The kernel 200 comprises three channels, a first channel 210R, a second channel 210G, and a third channel 210B, for detecting features in a red layer, a green layer, and a blue layer, respectively, of an input image. The kernel 200 may be used to generate output feature maps in a layer of a CNN, such as CNN 100 of FIG. 1. To generate an output feature map which will be used as an input into subsequent layers of the neural network, 27 multiply accumulates operations (i.e. 3×3×3=27) will be performed to compute a single output feature map. There may be multiple output feature maps generated at each layer of the CNN 100.

As a result of the training a large number of kernels may be produced. For example, as mentioned above, there may be upwards of 512 kernels, although it will be appreciated that there may be more or fewer kernels. To identify/classify an input or portions of an input, each kernel will be used to identify particular characteristics of an input. However, in some examples, processing every kernel may not be necessary. If a particular set of kernels are directed towards identifying/classifying an input as one type, and said kernels return a positive identification, or a value indicating that there is a high probability that an input is of a particular type, it may not be necessary to process a second set of kernels directed towards identifying/classifying an input as a second type.

Figure 3:
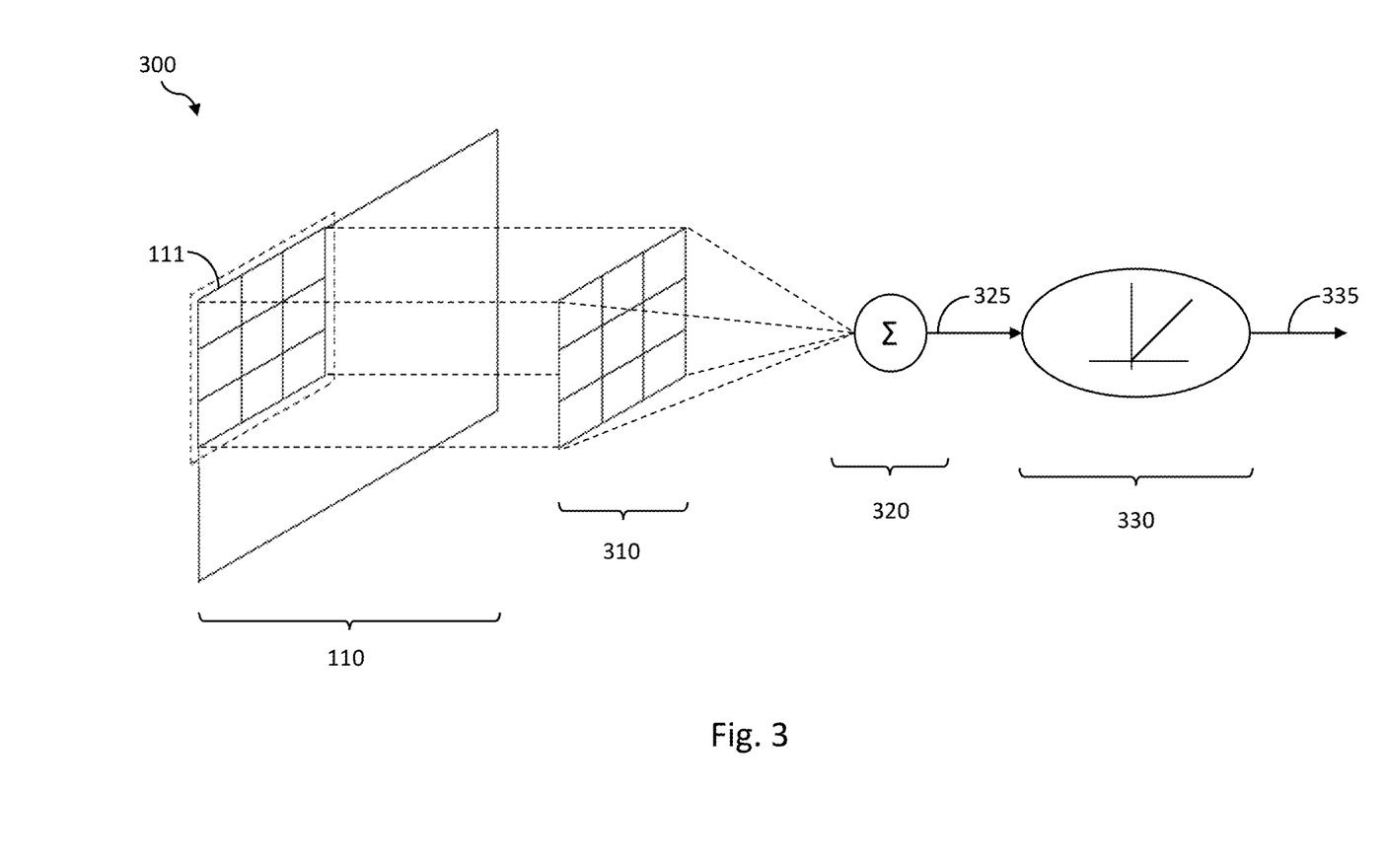
FIG. 3 is a schematic representation of the function of a neuron in a convolutional neural network.

FIG. 3 is a schematic representation 300 of the function of a neuron in a CNN, such as CNN 100 of FIG. 1. Multiple neurons may make up a convolutional layer 120, 140 in a CNN 100. A neuron may comprise a filter or kernel 310, a multiply-accumulate (MAC) function 320 and an activation function 330. The input to the neuron may be an input image or other data from the input layer 110, alternatively the input may be a region of the input data 111, an input feature map 120a, 120b, 120c, or a pooled input feature map 130a, 130b, 130c from a previous pooling layer 130.

The kernel 310 allows features of the input data to be identified. For example, some of the kernels 310 may be used to identify edges in the input data represented by the input data and other may be used to identify horizontal or vertical features in the input data (although this is not limiting and other kernels are possible). The precise feature that a kernel will identify depends on the object the CNN 100 is trained to identify. The kernel of FIG. 2 is for example a 3×3 matrix, which may be convolved with the input data region 111 of the input data with a stride of 1. Convolution of the input data region 111 with the kernel 310 allows for the identification of features the kernel 310 is designed to detect.

Convolution generally involves multiplying each input data item or input feature map of an input, or input region 111 (in this example a 3×3 input data region) by a weight in the kernel 310 before adding the result of this operation to the result of the same operation applied to neighboring pixels, or neighboring feature map elements. A stride, for example, refers to the number of pixels or activation map elements a kernel 310 is moved by between each operation. A stride of 1 therefore indicates that, after calculating the convolution for a given 3×3 input data region, the kernel is moved across the input by 1 pixel and the convolution is calculated for a subsequent input region. This process may be repeated until the kernel has been convolved with the entire input data region, the entire portion of the input data for which a convolution is to be calculated, or with the entirety of an activation map the kernel 310 is to be convolved with. A convolution generally involves a multiplication operation and an addition operation (sometimes referred to as an accumulation operation). Thus, a neural network accelerator, may include a multiplier-accumulator (MAC) unit configured to perform these operations.

In some embodiments, the input data and/or input feature map may have multiple channels. In this case, the kernels of a neural network for processing such input data may also have multiple channels. For example, if the input data has 64 channels, then a kernel of a neural network for processing such data may be a 3×3×64 kernel. To compute the output feature map, the neural network will first undertake a multiply-accumulate operation on the first channel of the kernel with the first channel of the input data/input feature map. Each subsequent channel with then be computed accumulating the results until all channels are processed. In some embodiments, a bias may then be added to the output, and the result will be provided as an input to an activation function.

In the example of FIG. 3, the input data region 111 of the input data 110 is multiplied with the weights of the kernel 310 before accumulation 320. The resulting value 325, which may be referred to as an input value 325, may then be input into an activation function 330. As mentioned above, a bias generated during the training process may be added to the input value 325 prior to being input into the activation function 330.

The input value 325 is passed through the activation function 330, creating an activation output value 335. The activation function 330 of the neuron determines whether the neuron 'activates'. For example, the neuron will only activate if the kernel 310 convolving the input data region 111 has identified the features the kernel 310 is looking for. As such, the multiplying and accumulating 320 will result in a high convolution output value which will provide a positive input 325 to the activation function 330. This results in a non-zero activation output value 335.

In another example, the kernel 310 convolving the input data region 111 does not identify the features the kernel 310 is looking for. As such, the multiplying and accumulating 320 will result in a low or negative input value 325 to the activation function 330. This results in an activation output value 335 of zero i.e. the neuron is not 'activated'.

An activation function (sometimes referred to as a rectifier) may be used to map an input to a predefined output, such as a value which is zero or greater. The activation function may be used to increase the nonlinear output of the neuron and is therefore often a non-linear function. Examples of activation functions include a sigmoid function, a hyperbolic tangent function or rectified linear unit (ReLU) function (schematically shown in the activation function 330 in FIG. 3), although other activation functions are possible. Using some activation functions may result in the amount of data to be processed being reduced (as some inputs may be mapped to 0, and therefore may not require further processing). Furthermore, the output data after application of an activation function may contain a large number of zeros and small values, the data can then be compressed, reducing memory access and memory bandwidth.

Referring back to the example in FIG. 1, the convolutional layer 120 may involve the convolution of 64 different kernels with the input data 110 of the first layer. Each of the 64 kernels is for example arranged to identify a different respective feature of the input data. In the example of FIG. 1, whereby the convolutional neural network is used to identify animals from photos, the 64 kernels of convolutional layer 120 may be used to identify features such as lines, curves, edges etc. Further convolutional layers, such as 140, may be used to identify more sophisticated features, based on the combined features of those identified in the previous layer 120 e.g. trunk, paws, beak, mane etc. Therefore, as the input data 110 is processed by the convolutional neural network 100, different kernels will be activated depending on which features are identified. The fully connected layer 160 may then use the features identified by the kernels to classify the input data 110 into various outputs e.g. elephant 170a, tiger 170b, swan 170c, horse 170d.

In the example of FIG. 1, in which the input data is an image of 224×224 pixels, with 3 color channels, and is convolved with 64 kernels of a size of 3×3 weights, the convolutional layer 120 of the convolutional neural network 100 involves 224×224×3×(3×3)×64 multiply-accumulate operations, i.e. 86 million multiply-accumulate operations. There will also be a large number of further multiply-accumulate operations associated with further convolutional layers 140 of the convolutional neural network 100, which involve convolving the output of the previous layer 130 with e.g. 256 kernels. As will be appreciated, though, other neural networks may involve convolutions with a different number of kernels. Nevertheless, classification of an image using a neural network typically involves a large number of data processing operations, each of which consumes power. Reduction of the number of data processing operations, while still retaining the same classification accuracy and efficiency, may save processing power.

Accordingly, by reducing the number of kernels processed by a particular layer or in a particular neural network, the number of memory fetches and amount of processing may be reduced.

Figure 4:
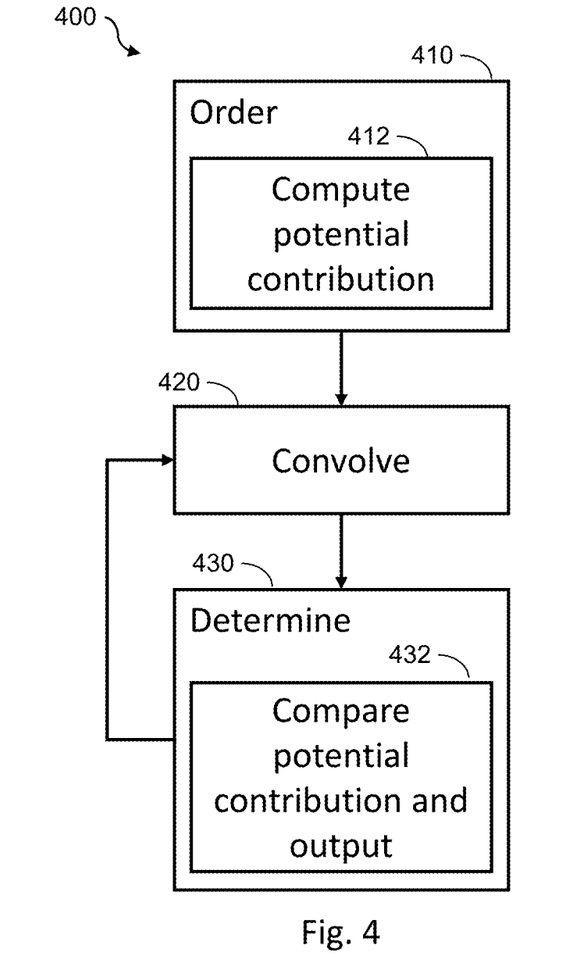
FIG. 4 is a flow diagram showing a method of optimizing a neural network by reducing kernel computations.

FIG. 4 is a flow diagram showing a method 400 of optimizing a neural network by reducing kernel computations. The neural network optimization method may be implemented by a neural network optimization system, such as that illustrated schematically in FIGS. 6 and 7 (described below).

At item 410 of FIG. 4, the channels in a kernel are ordered. The kernel set may be ordered by any particular metric, however in some examples, the kernel set may be order based upon a potential contribution computed at item 412 which may form part of item 410. It will be appreciated there are a number of ways to order a kernel set, however one way is to calculate an absolute sum of the weights of each channel in the kernel. In other embodiments, the method of ordering the kernels may be dependent upon whether the input data or weight data is signed or unsigned. In some examples, a sum of the weights of a channel in the kernel may be calculated using only large weight values, thereby potentially excluding small weight values from the sum. The weights of each kernel may be calculated during a training phase of the CNN as described above.

In this example, an absolute sum of the weights of each portion of the kernel is calculated and then the kernels having a higher absolute sum, representing the kernels which have the most significant impact when processed, are placed higher in the ordering than those having a lower absolute sum. For example, the absolute sum of the kernel 200 of FIG. 2 would be 390. The red channel 210R has an absolute sum of 0, the green channel 210G has an absolute sum of 30, and the blue channel 210B has an absolute sum of 360.

In some embodiments, the potential contribution of a particular kernel channel; may be based upon an output of the kernel channel when used to process an input. The feature map output by the kernel channel when processed may undergo a pooling operation such as max pooling described above. The potential contribution may be calculated by determining values for a predetermined region of input data or an input feature map to be aggregated or combined, and the highest value within the region is selected as the potential contribution. For example, with a 2×2 max pooling, the highest value of an output within a 2×2 patch of the input feature map or input data is selected as potential contribution.

At item 420 a first of the kernels is processed. Processing a kernel, as described above, may comprise convolving all the channels of kernel with all the channels of the input data or input feature map. In some embodiments, the channels of the kernel may be convolved with a portion of the input data (or a feature map obtained by convolution of one or more previous kernels with the input data) to identify the feature, the kernel is designed to detect. Convolution generally involves adding each element of an input (for example a 3×3 image patch) to its neighboring elements, weighted by the kernel. A stride, for example refers to the number of elements a kernel is moved by between each operation. A stride of 1 therefore indicates that, after calculating the convolution for a given 3×3 patch, the kernel is slid across the input, such as an image, by 1 element and the convolution is calculated for a subsequent patch. This process may be repeated until the kernel has been convolved with the entirety of the input (or portion of the input for which the convolution is to be calculated). A kernel may sometimes be referred to as a filter kernel or filter. A convolution generally involves a multiplication operation and an addition operation (sometimes referred to as an accumulation operation). Thus, a neural network accelerator, such as that described below in relation to FIG. 6, may include a multiplier-accumulator (MAC) unit configured to perform these operations.

Following the processing of a first channel of a kernel, at item 430, it is determined whether to process further channels of the kernels for a particular portion of the input. Kernels may be processed in a number of different orders. For example, a kernel may first be processed for the entirety of the input data, moving along by a predetermined stride amount. Alternatively, a first kernel may be processed for a first portion of the input data, and then further kernels may be processed for the same portion of the input data, before repeating each kernel for a second portion of the input data. Where a kernel comprises a plurality of channels, such as kernel 200 of FIG. 2, a first of those channels may be convolved with the corresponding channel of the input data, for example the red channel kernel 210R may be convolved with the red portion of an input image, then the green channel kernel 210G may be convolved with the green portion of the input image, followed by the blue channel kernel 210B being convolved with the blue portion of the input image.

Determining whether to process further channels of the kernels for a portion of the input data or a feature map may comprise convolving the first kernel with the portion and then determining whether the value of the activation output is smaller than the potential contribution of a second kernel of the ordered kernels. This may be undertaken at item 432 which forms part of the determination item 430. If the activation output of the first kernel is smaller than the potential contribution of the remaining channels of the kernel, then the result at the output of an activation function for the subsequent kernel will be, for example when using a ReLU activation function, zero. Therefore, processing of the further kernels is not required. As the kernels have been ordered, this also means that any other subsequent kernels need not be processed as well. It will be appreciated that other activation functions may be used. Different activation functions will therefore have different limits. For example, a ReLU6 activation function may have a lower limit of zero, where values lower than zero result in a zero output, and an upper limit of six, where values greater than or equal to six result in an output of six. Therefore, depending on the activation function, we may be able to determine if the current value will result in an output above the upper limit or below the lower limit. If so any further processing will not change the result, and therefore may be eliminated.

For example, using the kernel 200 of FIG. 2 and input image data, the channels 210R, 210G, 210B of the input data may be convolved with the red, green, and blue channels of the input data respectively. In this case, a reduction in the computation may be achieved by determining whether to process additional channels. Firstly, the channels 210R, 210G, 210B will be ordered by calculating the absolute sum of the weights for each channel. In this example, the red channel 210R has a value of 0, the green channel 210G has a value of 30, and the blue channel 210B has a value of 360. Therefore, the method 400 will first convolve the blue channel 210B at step 420.

Convolving the kernel, or in this example, channel 210B comprises an output and a maximum value for that output. For example, where the input is 8-bit unsigned (from 0 to 255) image data, and the weights represent a signed 8-bit number (i.e. from −128 to +127), the maximum value of the each of the channels 210R, 210G, 210B will be:

Red Channel 210R: (0×255)+(0×255)+(0×255)=0
Green Channel 210G: (10×255)+(10×255)+(10×255)=7650
Blue Channel 210B: (100×255)+(100×255)+(100×255)=76,500

This will be combined with a bias calculated during the training phase, for the purposes of this example the bias will be −10,000, although other bias values may be used. Using this information, it can be determined whether other channels of the kernel 200 will affect the output of an activation function. For example, if an ReLU activation function is used, for the activation output to be non-zero, then the following must be true: (blue channel×weights)+(green channel×weight)+(red channel×weight)−10,000>0

Therefore, if the blue channel 210B and green channel 210G are less than 10,000 the result will be zero and the processing of the red channel 210R may be eliminated. Similarly, if the maximum value of the blue channel 210B is less than 17,650, then if we are using an ReLU activation function, as in this example, the other channels 210R, 210G need not be computed as we know that the result of the activation function will be zero.

Whilst the above example determines whether further computations of channels of a kernel may be eliminated, it will be appreciated that the same principles can apply to kernels themselves. Furthermore, whilst in the example an ReLU activation function is used, it will be appreciated that other activation functions, for example, a linear, binary step, tanh or any other appropriate activation function may be used. Each activation comprises a range of values which result in a similar output, such as outputs of less than zero result in a zero output for a ReLU activation function; and results of greater than 1 produce an output of 1 in a binary step activation function. When these activation functions are used, the method detects whether the outputs of the kernel result in a value within the range of values which result in a similar output.

In a further embodiment, max pooling may be used to eliminate the processing of further kernels. For example, where the maximum contribution of the other channels, for example when processing the red channel 210R of kernel 200, we know that the maximum contribution of the blue channel 210B is 76,500 and the maximum contribution of the green channel 210G is 7,650, it can be determined whether computation of other values in the pooling region may be eliminated. For example, where a 2×2 max pooling is used over an area of input data, such as an image or input feature map, and the convolved results of the red channel with the input, are:

(0,0): 50,000
(0,1): −10,000
(1,0): 55,000
(1,1): 8,000

Then, if the training of the CNN 100 resulted in a bias of −10,000 along with using an ReLU activation function, as discussed above, further computation of the green and blue channels may be eliminated for area (0,1) as the result will be 0 Similarly, the maximum value of area (1,1) may be calculated by combining the value of the red and green channels (i.e. 8,000+7,650=15,650), as this is lower than the values of (0,0) and (1,0) further processing of the green and blue channels may also be eliminated for area (0,1). Therefore, in order to determine the maximal value for the 2×2 max pooling, we only need to process all three channels 210R, 210G, 210B for areas (0,0) and (1,0).

Figure 5:
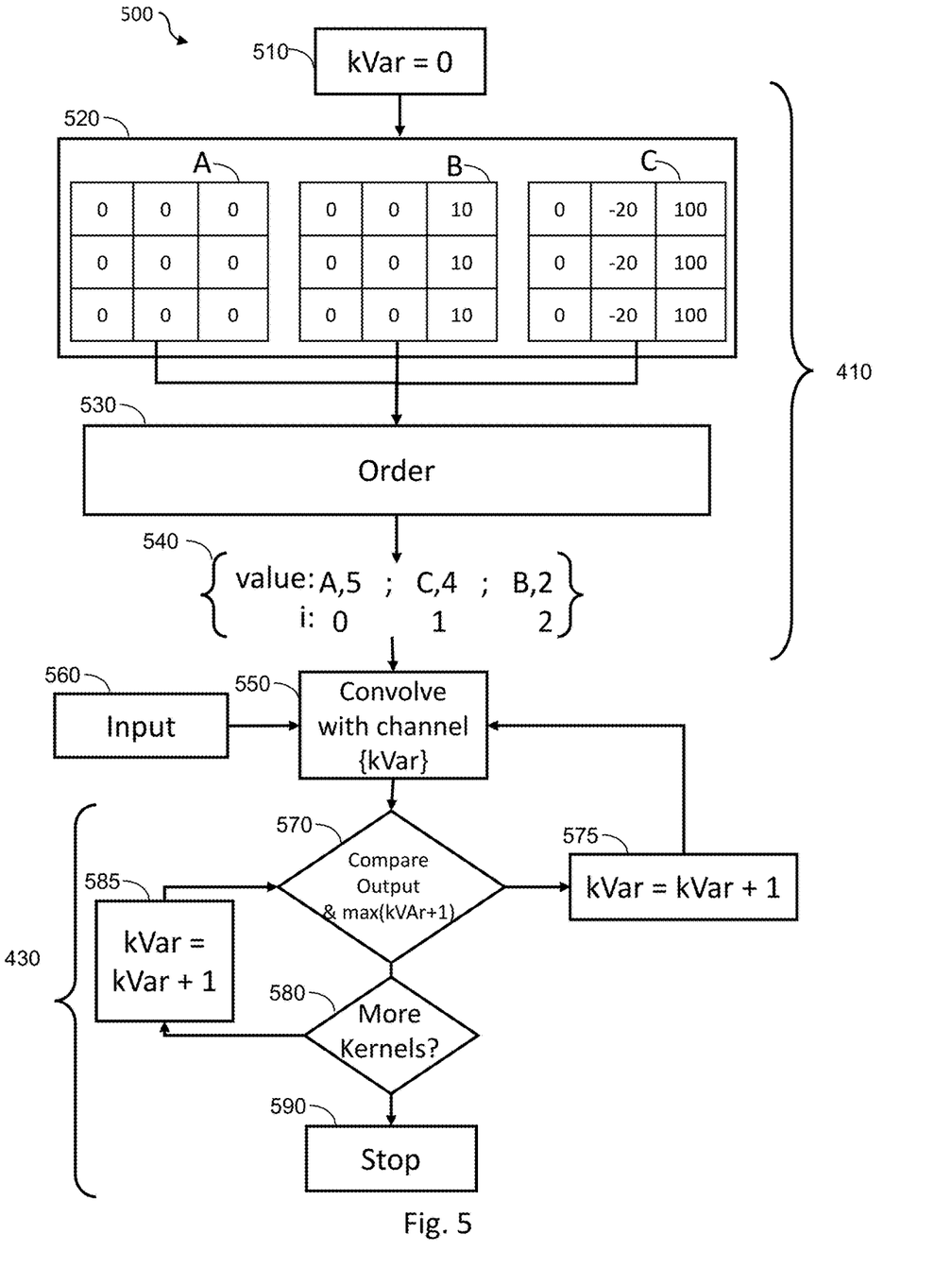
FIG. 5 is a schematic representation of a process for optimizing a neural network by reducing the number of kernel computations.

FIG. 5 is a schematic representation of a process 500 for optimizing a neural network by reducing the number of kernel computations undertaken according to the method 400 of FIG. 4. At the start of the process at item 510, a variable, kVar, is initialized to zero. A number of kernel channels A, B, C, collectively 520, which have been generated during a training phase of a convolutional neural network, such as CNN 100 of FIG. 1, relating to the layer to be processed are then gathered to be ordered at item 530. The kernel channels 520 are 3×3 kernel channels, however it will be appreciated that the kernels may be of other sizes. Similarly, there may be more than three kernel channels, and the number and size of the kernels will be dependent on the output of the training process of the convolutional neural network.

At item 530, the kernel channels 520 are ordered. As mentioned above, one method of ordering the kernel channels 520 is to calculate an absolute sum of the weights of each channel of the kernel A, B, C. For example, kernel channel A, based on the weights shown in FIG. 5, would have an absolute sum of 5, kernel channel B will have an absolute sum of 2, and kernel channel C will have an absolute sum of 4. It will be appreciated that other methods of ordering the kernel channels 520 may be used, for example, an absolute average of the weights may be used, smaller weight values may be ignored as described above, or a sum or average weight value may be calculated (not an absolute value).

As shown at item 540, the kernel channels 520 are ordered according to their absolute sum of weights. Although it will be appreciated that the kernel channels 520 may be ordered in a different way. The higher the absolute sum of the weights the higher the impact that kernel is likely to have on any output. Items 510, kernel channels 520 and items 530 and 540 are all representative of item 410 of FIG. 4.

Once the channels of the kernels 520 have been ordered, the first of the ordered kernel channels 520 is processed. Processing the kernel channel, in this case kernel channel A, comprises convolving an input 560 with the kernel channel A to produce an output. The input 560 may be image data, where for example the convolutional neural network is arranged to detect features of the image, or alternatively the input 560 may be an input feature map generated from a previous layer of the convolutional neural network. Once kernel channel A has been convolved with the input 560, the convolution output is compared with the maximum value of the output feature map of the next kernel channel, in this case kernel channel C. This comparison may be based upon a maximal value of the kernel channels 520 and a bias calculated during the training phase.

For example, where a ReLU activation function is used, any values which are below zero result in a zero output. Therefore, if it can be determined that the activation output generated produced by kernel channel A is such that the maximal value of kernel channel C would have no effect on the output of the activation function, in this example, the sum of kernel channel A and kernel channel C (and, if applicable any bias) would still be less than zero, there is no need to process kernel channel B, as this will have no effect on the output of the activation function. If this is the case, and kernel channel C will have no effect, then the process 500 moves to item 580, where it is determined whether there are any further kernel channels to process. In this example, there is kernel channel C needs processing therefore, the process 500 increments kVar at item 585. Item 570 is then repeated where the convolution output of kernel channel A is compared to the maximal value of kernel channel B. If it is determined that kernel channel B will have an effect on the output of an activation function, then kVar is incremented at item 575, and kernel channel B is then processed with the equivalent channel of the input 560 at item 550. For example, where the input data 560 is an image, and the kernel channels 520 represent a red, green and blue channel, kernel channel B may be arranged to process the blue channel of the image data.

Similarly, if it is determined at item 570 that the convolution output of kernel channel C will have an effect on the output of an activation function, then kVar is incremented at item 575, and kernel channel C is convolved with the input 560 at item 550.

Once all the kernel channels 520 have been convolved with the input 560, there will be no further kernel channels 520 to process therefore at step 580 the process 500 will proceed to item 590 where the process 500 will terminate. Items 570, 575, 580, 585 and 590 are all representative of item 430 of FIG. 4.

Figure 6:
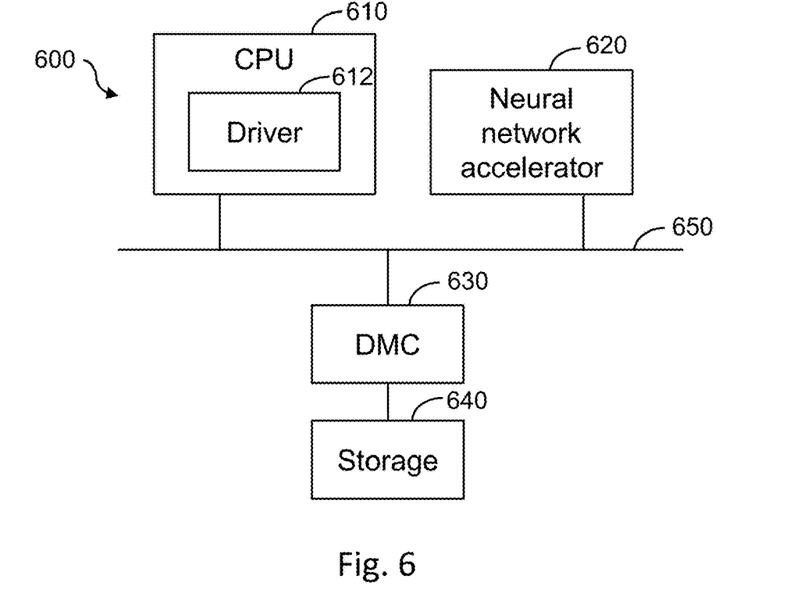
FIG. 6 is a schematic representation of a computer device for use with a method for optimizing a neural network by reducing kernel computations.

FIG. 6 shows schematically a computer device 600 for use with a method for optimizing a neural network by reducing kernel computations according to examples. The computer device 600 includes at least one processor. In this example, the computer device 600 includes a central processor unit (CPU) 610. The computer device 600 also includes a neural network accelerator 620, which is a processor dedicated to implementing the classification of data using a neural network. In other examples though, the computer device 600 may include other or alternative processors such as a microprocessor, a general-purpose processor, a digital signal processor (DSP), an application specific integrated circuit (ASIC), a field programmable gate array (FPGA), neural network accelerator (NNA), neural network processor (NNP), or other programmable logic device, a discrete gate or transistor logic, discrete hardware components, or any suitable combination thereof designed to perform the functions described herein. The computer device 600 may also or alternatively include a processor implemented as a combination of computing devices, for example a combination of a DSP and a microprocessor, a plurality of microprocessors, one or more microprocessors in conjunction with a DSP core, or any other such configuration. The computer device 600 may also or alternatively include at least one graphics processing unit (GPU).

The CPU 610 of FIG. 6 includes a driver 612 which, for example, provides an interface between software configured to control or configure the neural network and the neural network accelerator, which is configured to perform the processing to implement the neural network. In other examples, the neural network may be implemented using a more general processor, such as a CPU or a GPU.

In the alternative embodiment described above, the driver 612 of the CPU 610 may be configured to process, using the CPU 610, the kernel set to produce the new kernel set prior to the training of the network in accordance with any of the methods 200, 300, 500 previously described in relation to FIGS. 2, 3, and 5. Thereby removing the requirement to retrain the neural network using the new kernel set.

The computer device 600 also includes a dynamic memory controller (DMC) 630 which may be used to control access to storage 640 of the computer device 600. The storage 640 is for example external to the neural network accelerator 620 and may be a random-access memory (RAM) such as DDR-SDRAM (double data rate synchronous dynamic random-access memory). In other examples, the storage 640 may be or include a non-volatile memory such as Read Only Memory (ROM) or a solid-state drive (SSD) such as Flash memory. The storage 40 in examples may include further storage devices, for example magnetic, optical or tape media, compact disc (CD), digital versatile disc (DVD) or other data storage media. The storage 640 may be removable or non-removable from the computer device 104. In some embodiments, the storage may be used for storing the original and new kernel sets. Alternatively, the original and new kernel sets may be stored in on-chip memory within the neural network accelerator 620, or other component of the computer device 600.

The components of the computer device 600 in the example of FIG. 6 are interconnected using a systems bus 650. This allows data to be transferred between the various components. The bus 650 may be or include any suitable interface or bus. For example, an ARM® Advanced Microcontroller Bus Architecture (AMBA®) interface, such as the Advanced eXtensible Interface (AXI), may be used.

Figure 7:
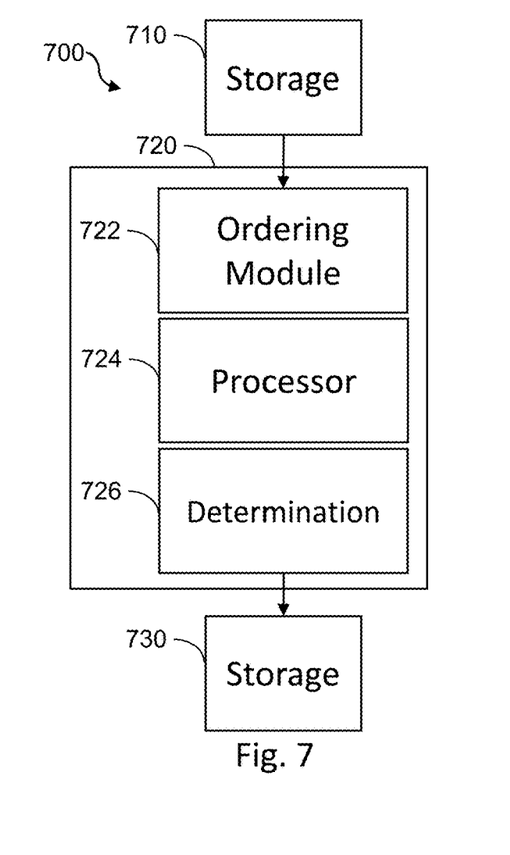
FIG. 7 is a schematic representation of an optimization system for optimizing a neural network by reducing kernel computations.

FIG. 7 shows schematically an optimization system 700 for optimizing a neural network by reducing kernel computations according to examples. The optimization system 700, may form part of a neural network accelerator, such as the neural network accelerator 620 of FIG. 6, alternatively, the optimization system 700 may form part of a separate processor, such as the CPU 610, or Driver 612 of FIG. 6, or even a GPU.

The system 700 comprises storage 710 for holding a plurality of kernels generated by training of a neural network. The system 700 also comprises an optimization module 720, further comprising an ordering module 722, a processor 724, and a determination module 726. The ordering module 722 retrieves kernels from the storage 710, and is arranged to order the kernels based upon a predetermined metric, such as the absolute sum of weights as described above. However, it will be appreciated that other metrics may be used. Once the kernels have been ordered, the processor 724 is arranged to process a first of the kernels, wherein the first kernel is determined to be the one most likely to have a significant impact on the output of an activation function. The processor 724 convolves the kernel with input data, such as an image or an input feature map. Once processed, the determination module 726 determines whether processing subsequent kernels, of the ordered kernels will affect the output of the activation function. For example, where the activation function is an ReLU activation function if the output is below zero, the output is zero therefore, any kernels which will result in a below zero output need not be processed as the output is known to be zero. Similarly, where a binary step activation function is used, the output is always 1 when the input is above 1, therefore, if it is known that the output of the convolution will be above 1, there is no need to process the kernel.

In some embodiments, the output of the convolution may be stored in further storage 730. The further storage 730 may be the same as the storage 710 holding the original kernels, or alternatively, may by separate storage.

The order of processing steps in the examples described above are merely examples. In other examples, these processing steps may be performed in a different order.

It is to be understood that any feature described in relation to any one example may be used alone, or in combination with other features described, and may also be used in combination with one or more features of any other examples, or any combination of any other examples. Furthermore, equivalents and modifications not described above may also be employed without departing from the scope of the accompanying claims.

What is claimed is:

1. A method of reducing kernel computations; the method comprising:

ordering a plurality of kernel channels to generate a set of ordered kernel channels based on a potential contribution of each of the plurality of kernel channels, the set of ordered kernel channels having an order of highest potential contribution to lowest potential contribution, and wherein the potential contribution of a given kernel channel is based on an absolute sum of weights associated with the given kernel channel and a given output of the kernel channel when used to process a given input, such that a first kernel channel of the set of ordered kernel channels has the largest potential contribution;

convolving the first kernel channel of the set of ordered kernel channels with input data to produce a convolution output; and determining whether to convolve subsequent kernel channels of the set of ordered kernel channels, wherein the step of determining whether to convolve subsequent kernel channels of the set of ordered kernel channels comprises considering the potential contribution of each of a plurality of the subsequent kernel channels of the set of ordered kernel channels, in combination with the convolution output of the first kernel channel.

2. The method of reducing kernel computations of claim 1 further comprising a step of processing the convolution output value using an activation function to produce an activation output value.

3. The method of claim 2, wherein the activation function is any one of a rectified linear unit, a binary step, sigmoid or tanh activation function.

4. The method of reducing kernel computations of claim 2, further comprising a step of determining whether to convolve subsequent kernel channels will impact the activation output value, when the potential contribution exceeds a predetermined threshold.

5. The method of reducing kernel computations of claim 4, wherein subsequent kernel channels are not processed if it is determined that convolving the subsequent kernel channels will not impact the activation output value.

6. The method of reducing kernel computations of claim 2, further comprising determining the potential contribution for the subsequent kernel channels when the activation output value of the first of the ordered kernels results in the activation function being activated.

7. The method of reducing kernel computations of claim 2, further comprising determining whether a subsequent convolution output will result in a change in the activation output value.

8. The method of reducing kernel computations of claim 7, further comprising computing a further convolution output when it is determined that the subsequent convolution output will result in a change in the activation output value.

9. The method of reducing kernel computations of claim 1, further comprising a step of analyzing the convolution output of a kernel channel applied to a region of the input data and determining maximum contribution for the region.

10. The method of reducing kernel computations of claim 9, wherein the analysis of the convolution output comprises determining a max pooling of the kernels over predetermined regions of the input data.

11. The method of reducing kernel computations of claim 10, wherein the predetermined regions are 2×2, 3×3 or 4×4.

12. The method of reducing kernel computations of claim 10, wherein determining the potential contribution further comprises convolving each channel of the kernel of the max pooling consecutively.

13. The method of reducing kernel computations of claim 1, further comprising storing the convolution output if the convolution output is a maximal value.

14. The method of reducing kernel computations of claim 1, wherein processing comprises convolving a first kernel channel against a first portion of the input data, and each subsequent kernel channel against said first portion of the input data.

15. The method of reducing kernel computations of claim 1, wherein processing comprises convolving a first kernel channel with a first portion of the input data, and subsequent kernel channels with subsequent portions of the input data.

16. The method of reducing kernel computations of claim 1, wherein processing comprises convolving a first kernel channel with a first portion of the input data, and then the first kernel channel against subsequent portions of the input data.

17. The method of reducing kernel computations of claim 1, wherein the potential contribution is calculated based on the sum of the weights of subsequent kernel channels.

18. The method of reducing kernel computations of claim 1, wherein the weights of the kernel are calculated during a training process of a convolutional neural network associated with the kernel.

19. The method of reducing kernel computations of claim 1, wherein the input data is an input feature map.

20. The method of reducing kernel computations of claim 1, wherein the convolution output is an output feature map.

21. The method of reducing kernel computations of claim 1, wherein the step of determining whether to convolve subsequent kernel channels comprises considering the potential contribution of at least one of the plurality of subsequent kernel channels in combination with any of a bias; or a type of activation function.

22. A system for reducing kernel computation, the system comprising:
an ordering module for ordering a plurality of kernel channels to generate a set of ordered kernel channels based on a potential contribution of each of the plurality of kernel channels, the set of ordered kernel channels having an order of highest potential contribution to lowest potential contribution, wherein the potential contribution of a given kernel channel is based on an absolute sum of weights associated with the given kernel channel and a given output of the kernel channel when used to process a given input, such that a first kernel channel of the set of ordered kernel channels has the largest potential contribution;
a processing module for convolving the first kernel channel of the set of ordered kernel channels with input data to produce a convolution output; and
a determination module,
wherein the determination module considers a potential contribution of each of a plurality of one or more subsequent kernel channels of the set of ordered kernel channels in combination with the convolution output of the first kernel channel.

23. The system for reducing kernel computations of claim 22, wherein the input data is an input feature map.

24. The system for reducing kernel computations of claim 22, wherein the determination module considers a potential contribution of at least one of the plurality of subsequent kernel channels in combination with any of a bias; or a type of activation function.

25. A non-transitory computer-readable storage medium comprising a set of computer-readable instructions stored thereon which, when executed by at least one processor, cause the at least one processor to produce a frame, the instructions comprising:
ordering a plurality of kernel channels to generate a set of ordered kernel channels based on a potential contribution of each of the plurality of kernel channels, the set of ordered kernel channels having an order of highest potential contribution to lowest potential contribution, wherein the potential contribution of a given kernel channel is based on an absolute sum of weights associated with the given kernel channel and a given output of the kernel channel when used to process a given input, such that a first kernel channel of the set of ordered kernel channels has the largest potential contribution;
convolving the first kernel channel of the set of ordered kernel channels with input data to produce a convolution output; and
determining whether to convolve subsequent kernel channels of the set of ordered kernels, wherein the step of determining whether to convolve subsequent kernel channels of the set of ordered kernel channels comprises considering the potential contribution of each of a plurality of the subsequent kernel channels of the set of ordered kernel channels in combination with the convolution output of the first kernel channel.

\* \* \* \* \*